Figure 1:
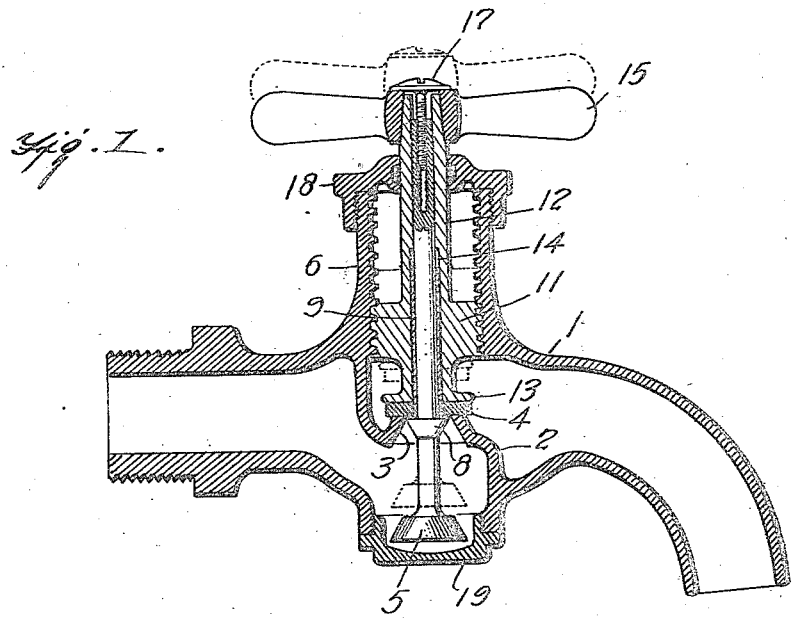

G. A. RICKS.
FAUCET.
APPLICATION FILED FEB. 7, 1917.

1,242,864. Patented Oct. 9, 1917.

WITNESSES

INVENTOR
GEORGE A. RICKS,
BY
ATTORNEYS

UNITED STATES PATENT OFFICE.

GEORGE A. RICKS, OF LA FAYETTE, INDIANA.

FAUCET.

1,242,864.
Specification of Letters Patent.
Patented Oct. 9, 1917.

Application filed February 7, 1917. Serial No. 147,059.

*To all whom it may concern:*

Be it known that I, GEORGE A. RICKS, a citizen of the United States, and a resident of La Fayette, in the county of Tippecanoe and State of Indiana, have invented certain new and useful Improvements in Faucets, of which the following is a specification.

My invention is an improvement in faucets, and has for its object to provide a device of the character specified wherein a main valve and an auxiliary valve are provided rigidly connected, the auxiliary valve being normally in inoperative position and adapted to be moved into operative position, and to be so held by the water pressure when the main valve is withdrawn for purposes of repair or the like.

A further object is to provide a particular form of mounting for the main valve which will permit the same to be removed for repairs, without entirely withdrawing the stem from the faucet or valve casing.

Figure 2:
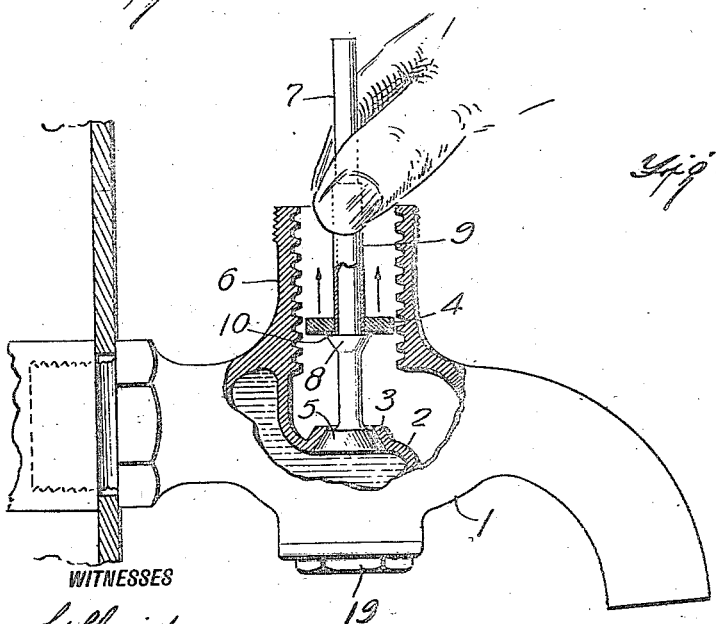
Figure 3:
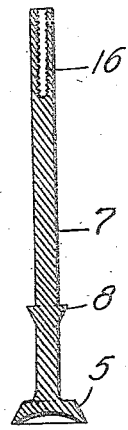

In the drawings:

Figure 1 is a longitudinal section of the improved faucet, showing the parts in normal position, Fig. 2 is a side view partly in section showing the auxiliary valve in use, and the manner of removing the main valve, and Fig. 3 is a longitudinal section through the valve stem.

In the present embodiment of the invention, the faucet comprises the usual casing 1 having a transverse partition 2 which is provided with a port 3, the said port being tapered or frusto-conical, as shown. The upper or small end of the port is a seat for the main valve 4, and the tapering interior of the port or the lower end thereof, is the seat for the auxiliary valve 5. The casing has a barrel or tubular extension 6 just above the port and co-axial therewith, the said extension being internally threaded, and the valve stem 7 with which the auxiliary valve 5 is integral, is movable through the extension and extends beyond the outer end of the same.

The stem has an annular upwardly extending shoulder 8 near its lower end, and upon this shoulder the valve 4 sits. A bushing 9 encircles the stem above the shoulder, and this bushing has a marginal radial flange 10 which abuts the shoulder 8 between the same and the valve. The bushing is slidable on the stem, and it will be obvious that when the bushing is withdrawn from the stem, the valve will be carried therewith. The valve is normally held compressed against the bushing flange and the shoulder by means of an annular threaded enlargement 11 on the sleeve 12 which encircles the stem and the bushing, and has at its lower end a marginal flange 13 bearing against the valve 4.

The sleeve is reamed or counter-bored to receive the bushing, as indicated at 14, and the handle 15 engages the upper end of the sleeve. The upper end is tapered externally as shown in Fig. 1, and the handle 15 has a similar opening for receiving the same. The upper end of the stem 7 has an axially threaded opening 16, and a screw 17 is engaged in the opening, the screw engaging the handle to hold it to the stem.

It will be noted from an inspection of Fig. 1 that the sleeve 12 extends beyond the stem at its outer end, and it will be evident that by tightening the screw 17 the flange 13 may be moved toward and from the shoulder 8, to tighten or loosen the pressure on the valve 4. The upper end of the extension 6 is closed by the usual cap 18 having a packing as shown, and the casing 1 is provided just beneath the port 3 with an opening normally closed by a plug 19. In order to assemble the parts, the plug 19 is removed and the stem, which is detached from the handle, and the sleeve 12, is passed through the port 3. The plug 19 may now be replaced, and the bushing and the valve 4 are placed on the stem. The sleeve is now slipped down over the valve stem until the enlargement 11 will engage with the threads of the extension, and the sleeve is turned down until the valve 4 is held in proper position. The handle 15 may now be connected to the stem and sleeve.

Under ordinary conditions, the valve 5 is never used, the valve 4 serving to open and close the port. When the parts are moved into the dotted line position of Fig. 1 to open the valve 4 the valve 5 is merely moved upward as indicated in dotted lines. When for any reason it is necessary to remove the valve 4, the entire mechanism consisting of the stem and the sleeve, is turned until the auxiliary valve may be engaged within the port 3. The water pressure will now hold the auxiliary port closed and the sleeve may be turned out of the extension.

To release the valve 4, the screw 17 is loosened and the sleeve 12 is removed. The bushing of the valve may now be slipped off the sleeve, as indicated in Fig. 2. It will be understood that the handle 15 might be threaded onto the sleeve 12, if desired, or in any other desired manner.

I claim:

1. A valve casing having a partition provided with a port and with valve seats at each end of the port, a valve stem extending through the port and having valves rigid therewith and spaced apart to alternatively engage the seats, the outermost valve being a disk having an opening for receiving the stem, said stem having a stop to limit the movement of the disk toward the inner valve, a bushing on the stem and having a marginal flange at its inner end, and engaging the inner face of said outermost valve to permit the removal of said valve with the bushing, a sleeve encircling the bushing and the stem and engaging at its inner end the outermost valve, and having threaded engagement with the casing, and a handle detachably connected with the stem and sleeve.

2. In combination with a valve casing and the valve, of a stem upon which the valve is movably mounted, said stem having a stop for limiting the movement of the valve thereon in one direction, a bushing encircling the stem and having a marginal flange between the valve and the stop, said casing having a tubular extension through which the bushing will extend when the valve is raised from its seat, a sleeve encircling the bushing and the stem and bearing at its inner end against the valve, and a handle detachably connected with the sleeve and the stem.

3. In combination with a valve casing and the valve, of a stem upon which the valve is movably mounted, said stem having a stop for limiting the movement of the valve thereon in one direction, a bushing encircling the stem and having a marginal flange between the valve and the stop, said casing having a tubular extension through which the bushing will extend when the valve is lifted from its seat.

GEORGE A. RICKS.

Witnesses:
JOSEPH W. McCREA,
M. RICKS.